US006245180B1

(12) United States Patent
Barnhardt

(10) Patent No.: US 6,245,180 B1
(45) Date of Patent: Jun. 12, 2001

(54) METHODS FOR BENDING BRAKE LINING MATERIAL AND FOR FORMING A LINED BRAKE SHOE

(75) Inventor: Keith F. Barnhardt, Bloomington, IN (US)

(73) Assignee: Midwest Brake Bond Company, Warren, WI (US)

( * ) Notice: Subject to any disclaimer, the term of this patent is extended or adjusted under 35 U.S.C. 154(b) by 0 days.

(21) Appl. No.: 09/286,089

(22) Filed: Apr. 2, 1999

(51) Int. Cl.[7] .................... B29C 35/00; B29C 43/18; B29C 53/04; B29C 65/44; B29C 65/54
(52) U.S. Cl. .............. 156/212; 156/256; 156/307.3; 156/307.7; 156/581; 156/583.1; 264/119; 264/153; 264/160; 264/236; 264/259; 264/295; 264/322; 264/339; 264/347; 425/297; 425/394
(58) Field of Search ..................... 264/119, 153, 264/160, 236, 259, 295, 322, 329, 347; 156/212, 256, 307.3, 307.7, 581, 583.1; 425/297, 510, 515, 394

(56) References Cited

U.S. PATENT DOCUMENTS

| 2,682,908 | * | 7/1954 | Schultz . | |
|---|---|---|---|---|
| 2,727,845 | * | 12/1955 | Bishop . | |
| 3,714,319 | * | 1/1973 | Kwolek | 264/236 |
| 3,881,982 | | 5/1975 | Morgan, Sr. et al. | 156/309 |
| 3,905,735 | * | 9/1975 | Thomas et al. | 425/256 |
| 4,008,517 | | 2/1977 | Schrader et al. | 29/527.6 |
| 4,138,463 | * | 2/1979 | Moneghan | 264/40.4 |
| 4,432,922 | * | 2/1984 | Kaufman et al. | 264/119 |
| 4,531,276 | | 7/1985 | Warwick et al. | 29/417 |
| 4,573,249 | | 3/1986 | Shellhause | 29/432 |
| 4,860,570 | | 8/1989 | Perrault et al. | 72/379 |
| 4,900,240 | | 2/1990 | Leinweber | 425/110 |
| 5,003,809 | | 4/1991 | Oyama | 72/446 |
| 5,132,065 | * | 7/1992 | Christie | 264/122 |
| 5,174,146 | | 12/1992 | Heurteboust et al. | 72/348 |
| 5,190,991 | * | 3/1993 | Parker et al. | 523/149 |
| 5,231,861 | * | 8/1993 | Tokumura et al. | 72/340 |
| 5,595,266 | * | 1/1997 | Cecere | 188/251 A |
| 5,621,958 | | 4/1997 | Woodcox | 29/426.4 |
| 5,810,969 | * | 9/1998 | Marchisseau et al. | 156/580 |

FOREIGN PATENT DOCUMENTS

| 2216066 | * | 10/1989 | (GB) | B29C/67/12 |
| 5692040 | * | 7/1981 | (JP) | B29C/1/00 |

* cited by examiner

*Primary Examiner*—Jan H. Silbaugh
*Assistant Examiner*—Michael I. Poe
(74) *Attorney, Agent, or Firm*—Harness, Dickey & Pierce, PLC

(57) ABSTRACT

Methods for forming a lined brake shoe having a curved brake lining attached to a table of the lined brake shoe. The curved brake lining is manufactured by molding a flat sheet of brake lining material in a partially polymerized state. This flat sheet is allowed to cool prior to be positioned within a press having warmed dies. The warm dies of the press form the curved brake lining while holding the curved brake lining in its desired shape. The warm dies restart the polymerization process. When further polymerization has been completed the curved lining is removed from the press. One embodiment places the table of the lined brake shoe in the press. Then, by adding a bonding material, the completed lined brake shoe can be manufactured while the polymerization process continues in the press.

24 Claims, 3 Drawing Sheets

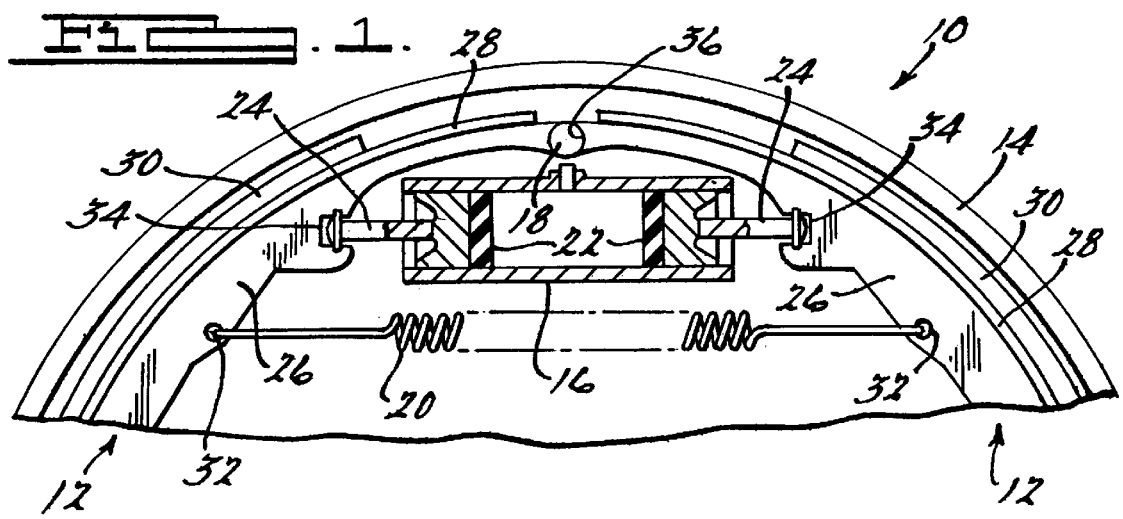
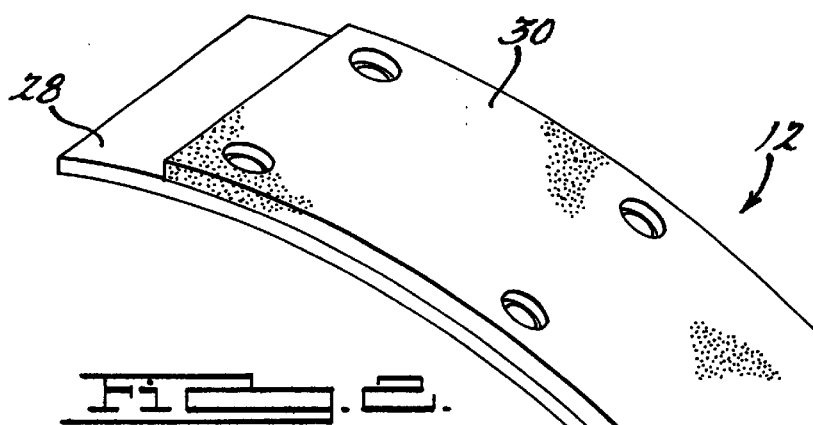
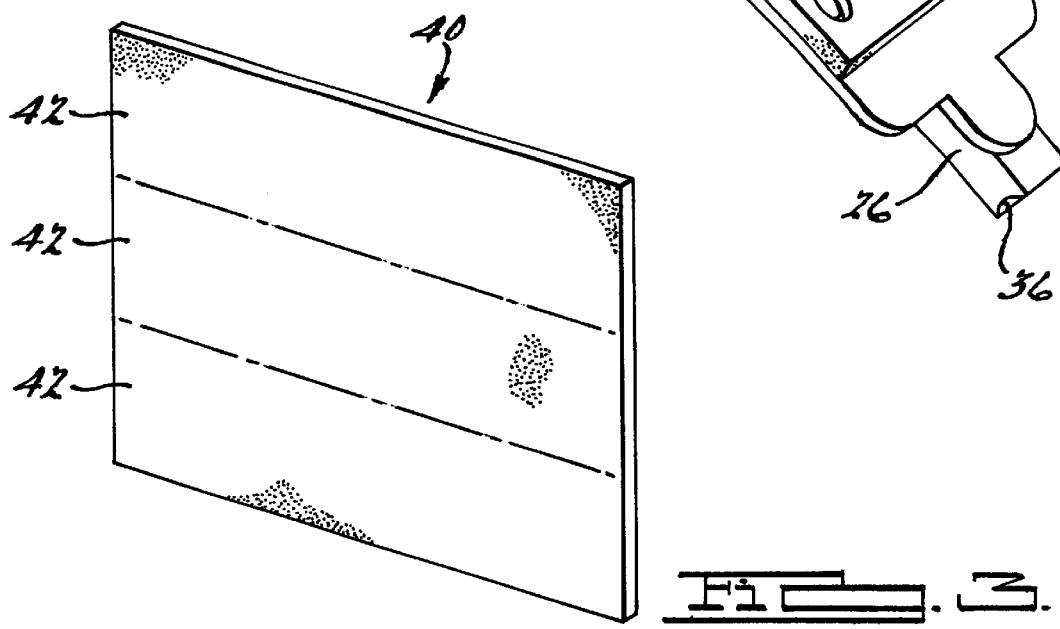

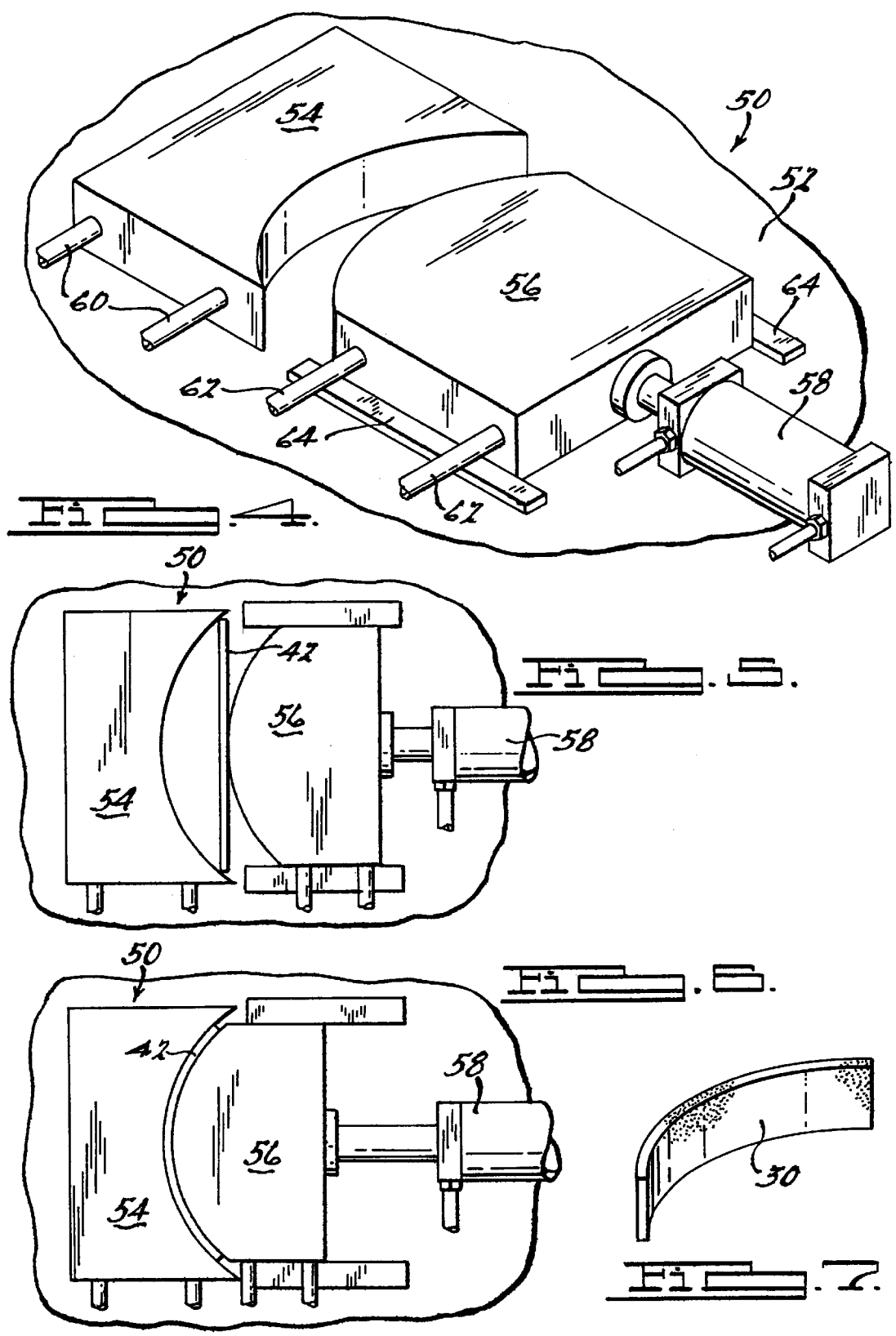

METHODS FOR BENDING BRAKE LINING MATERIAL AND FOR FORMING A LINED BRAKE SHOE

FIELD OF THE INVENTION

The present invention relates to brake linings. More particularly, the present invention relates to a method and an apparatus for the manufacture of curved brake linings and/or curved lined brake shoes.

BACKGROUND OF THE INVENTION

The automotive industry, including both cars and trucks, and the manufacturing community utilize drum brakes for their braking systems. The drum brake is known as an internal expansion brake and it includes a brake drum having an internal generally circular cylindrical braking surface. The brake drum normally rotates with the vehicle's wheel or with a rotating component of a machine tool. One or more lined brake shoes are located within the center of the circular cylindrical braking surface. The lined brake shoes have a web and a table. The web normally extends radially inward from the table. The table is a curved partially cylindrical member which provides a surface onto which is attached a sacrificial brake lining which is shaped to mate with the braking surface of the brake drum. The rotating wheel or component is stopped by radially extending the lined brake shoe such that the sacrificial brake lining frictionally engages the braking surface on the brake drum. The energy of the rotating wheel or component is dissipated by the frictional engagement between the braking surface of the brake drum and the brake lining on the lined brake shoe. Over time and use, the sacrificial lining is worn away and has to be replaced in order for the braking system to continue to function. Normally this involves the replacement of the lined brake shoe and the resurfacing of the braking surface of the brake drum. The worn lined brake shoe is not discarded, it is used as a core which is sent to a rebuilder who removes the old lining and replaces it with a new lining. The brake linings generally are circular-cylindrical segments which may be bonded, riveted or otherwise attached to the table of the brake shoe.

In one conventional method of manufacturing the curved brake linings, a press ram of a press is displaced downwardly toward a mold for shaping the material which is to be formed into the brake lining in the press. The cavity of the mold is formed into the shape of a circular cylindrical segment which is the desired shape for the finished brake lining. The composition of material which is to be bonded under heat and pressure to form the brake lining is introduced into this cavity during the closing of the mold. Prior art compositions have frequently been a fibrous mixture which is metered into the closed cavity. A sufficient amount of the material to form the brake lining is introduced into the cavity prior to the final closing of the cavity. The pressing of the mixture into the final shape for the brake lining is normally carried out in multiple pressing stages and the end product is generally desired to have a generally constant thickness and a desired density.

Another method of manufacturing the curved brake linings is to first mold a generally flat rectangular sheet of the lining material. The flat sheet is then formed into the curved shape by heating the sheet, placing it into a non-heated die and forming the flat sheet into the desired shape. The curved sheet is then cut to the desired size, if necessary, and then attached to the frame to make the brake shoe.

The prior art methods of manufacturing brake linings and lined brake shoes have met with commercial success in both the automotive and industrial applications. The continued development of the process has been directed towards more efficient methods of manufacturing higher quality brake linings and lined brake shoes, especially those used in industrial applications. The lined brake shoes for industrial applications have brake linings which are generally greater in thickness than similar parts in the automotive applications. The ability to successfully bend the curved segments of brake lining from flat stock decreases significantly with the increase in thickness of the material.

SUMMARY OF THE INVENTION

The present invention provides the art with a method of making brake linings and lined brake shoes which produces a higher quality component. The lining material is first molded into a flat sheet. During this molding process, only a partial polymerization of the resin component of the material occurs. The sheet is allowed to cool and is then surface ground to the desired final thickness. The sheet is then cut into the desired configuration, reheated and placed in a heated curved die which forms the brake lining to the desired shape. The hot die causes a continuation of the polymerization process while the lining is being held in the die at the desired shape. The polymerization process can be completed in the die after completing the polymerization process or the lining can be removed from the die after additional polymerization and placed in a post cure oven to complete the polymerization process if desired. The finished curved lining segments are then ready for attachment to the table of the brake shoe.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a fragmentary side elevational view, partially in cross section of a brake assembly in accordance with the present invention;

FIG. 2 is a perspective view of the lined brake shoe shown in FIG. 1;

FIG. 3 is a perspective view of a partially polymerized sheet of brake lining material;

FIG. 4 is a perspective view of the heated set of dies which form the brake lining into the desired shape;

FIG. 5 is a top plan view of the dies shown in FIG. 3 with the brake lining pre-form prior to the forming process;

FIG. 6 is a top plan view of the dies shown in FIG. 4 after the forming process; and FIG. 7 is a perspective view of the completed lining prior to being attached to a table of a brake shoe.

DETAILED DESCRIPTION OF THE PREFERRED EMBODIMENT

Figure 8:
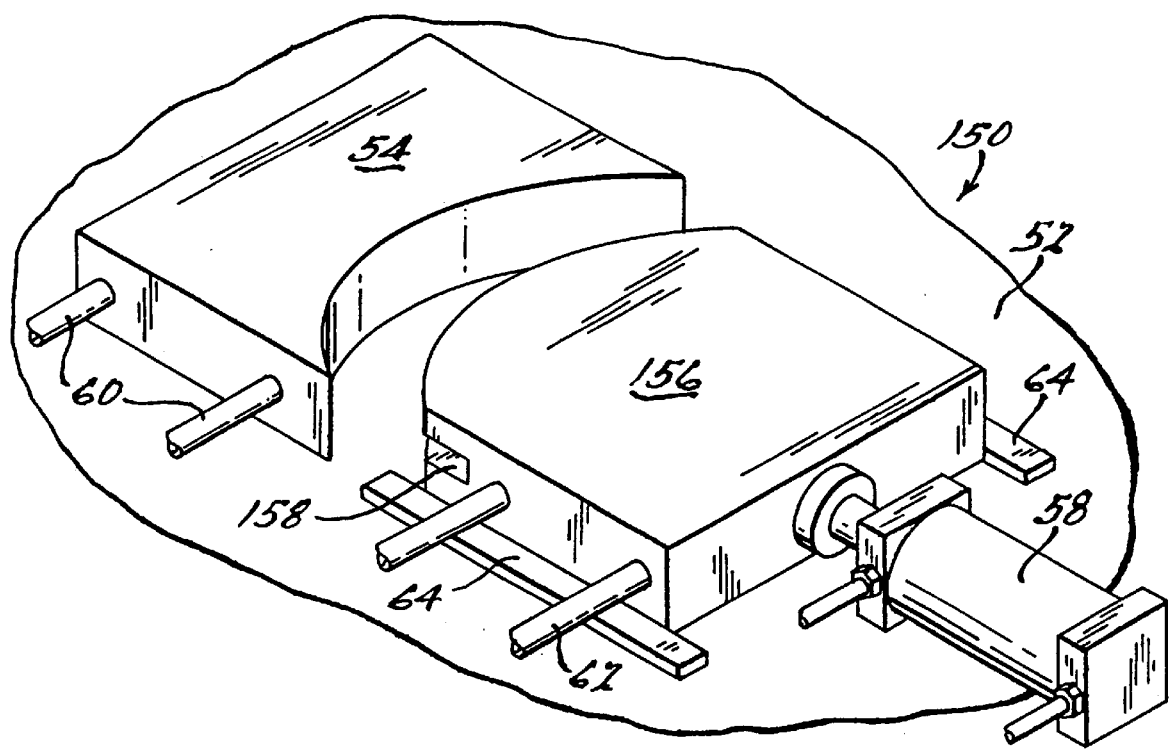
FIG. 8 is a perspective view of the heated set of dies which form the lined brake shoe of another embodiment of the present invention.

Referring now to the drawings in which like reference numerals designate like or corresponding parts throughout the several views, there is shown in FIG. 1 a typical brake assembly having lined brake shoes manufactured in accordance with the present invention which is designated generally by the reference numeral 10. Brake assembly 10 comprises a pair of lined brake shoes 12, a brake drum 14 and an actuating cylinder 16. Lined brake shoes 12 have opposing ends which abut a fixed pin 18 within brake drum 14. The outer ends of lined brake shoes 12 are interconnected by a tension spring 20 which keeps lined brake shoes 12 in a slightly withdrawn position with respect to the inner surface of brake drum 14. Actuating cylinder 16 includes a pair of movable pistons 22 which interlink with a respective lined brake shoe 12 through an actuating pin 24. In operation, hydraulic pressure within cylinder 16 is increased upon depression of the vehicles brake peddle or activation of the braking system. Pistons 22 will be forced outwardly thereby urging lined brake shoes 10 outwardly, the braking force being transmitted by pins 24. Lined brake shoes 10 will be brought into frictional contact with the interior cylindrical surface of brake drum 14 to frictionally brake the vehicle wheel assembly. While FIG. 1 is illustrating a typical hydraulic braking system, it is within the scope of the present invention to utilize the manufacturing technique of the present invention in other braking systems including but no limited to S-cam, wedge, electromechanic, spring, pneumatic or other braking systems known in the art.

Referring to FIGS. 1 and 2, lined brake shoe 12 comprises a radially extending curved portion or web 26, a partially cylindrical portion or table 28 and a brake lining 30. Web 26 includes a plurality of holes 32 for attachment of spring 20 and other assembly components, an actuating pin seat 34 and a fixed pin seat 36. Table 28 is fixedly attached to web 26 or table 28 and web 26 may be integrally formed. Brake lining 30 is secured to the outer surface of table 28 by riveting, bonding or other methods known in the art. Brake lining 30 is a sacrificial member which frictionally engages brake drum 14. Eventually brake lining 30 will wear away requiring the replacement of lined brake shoes 10.

Brake lining 30 of the present invention is manufactured by a unique process using a unique forming press. Brake lining 30 is cut from a partially polymerized molded sheet 40 shown in FIG. 3. Sheet 40 is molded in a die and is removed from the die prior to the complete polymerization of the material used to make sheet 40. This is different than the prior art which fully polymerizes the molded sheet prior to removal from the die. After cooling and being ground to a desired thickness, partially polymerized sheet 40 is then cut into a plurality of pre-form linings 42 as shown in phantom in FIG. 3. The amount of polymerization of sheet 40 prior to removal from the die is 20%–80% of the polymerization process. A preferred amount of polymerization is 40%–60% of the polymerization process.

Referring now to FIG. 4, a forming press 50 comprises a base 52, a concave die 54, a convex die 56 and a hydraulic cylinder 58. Concave die 54 is fixedly secured to base 52 and is provided with means for heating die 54 such as heated hydraulic oil supplied by hydraulic hoses 60. Convex die 56 is movably secured to base 52 and is also provided with means for heating die 56 such as hydraulic oil supplied by hydraulic hoses 62. A pair of guides 64 control the movement of die 56 with respect to base 52. While dies 54 and 56 are being shown heated by hydraulic oil, it is within the scope of the present invention to heat dies 54 and 56 electrically or by any other means known in the art. The temperature of dies 54 and 56 is maintained at a temperature high enough to continue the polymerization process of pre-form lining 42 as will be detailed below. Hydraulic cylinder 58 moves die 56 between an open position as shown in FIG. 5 and a closed position as shown in FIG. 6.

Referring now to FIG. 5, preform lining 42 is inserted between dies 54 and 56. The positioning of pre-form lining 42 between dies 54 and 56 can be done manually or it can be performed automatically by a feeding mechanism if desired. Once pre-form lining 42 is properly positioned, hydraulic cylinder 58 is energized to move die 56 to its closed position as shown in FIG. 6. The closing of die 56 forms pre-form lining 42 into the desired shape. Die 56 remains in the closed position for a specified period of time. During the time that die 56 remains closed, pre-form lining 42 is heated by the heated dies 54 and 56. The heating of pre-form lining 42 causes the polymerization process to start again. Die 56 remains closed until the polymerization process is complete. By completing the polymerization process in press 50, the desired shape is maintained and dimensional accuracy is significantly improved. Once the polymerization is complete, die 56 is moved to its open position and the completed brake lining 30 is removed as shown in FIG. 7. Finished brake lining 30 is then secured to table 28 to complete brake shoe 10.

An alternate method for manufacturing brake lining 30 is to have die 56 remain closed for a length of time during which a majority of the polymerization process is complete. Preferably, die 56 should remain closed until approximately 80%–90% of the polymerization process has been completed. Brake lining 30 is then removed and placed in an oven in order to complete the polymerization process. Thus, brake lining 30 would be partially polymerized during the manufacture of sheet 40, further polymerized by heated dies 54 and 56 and fully polymerized in the post cure oven.

An alternate method for manufacturing lined brake shoe 10 is shown in FIG. 8. A forming press 150 comprises base 52, concave die 54, a movable die 156 and hydraulic cylinder 58. Die 156 is similar to die 56 with the exception that die 156 includes a slot 158 which is designed to allow the mounting of web 26 and table 28 of brake shoe 10. Prior to the closing of die 156, a bonding material is applied to pre-form lining 42 and/or table 28 in order to bond brake lining 30 to table 28 during the bending process to complete the assembly of lined brake shoe 10 within forming press 150. In applications where only table 28 is used and web 26 is not present, slot 158 could be removed from die 156.

While the above detailed description describes the preferred embodiment of the present invention, it should be understood that the present invention is susceptible to modification, variation and alteration without deviating from the scope and fair meaning of the subjoined claims.

What is claimed is:

1. A method of manufacturing a curved brake lining comprising the steps of:

producing a generally flat molded sheet of brake lining material;

heating dies of a forming press;

positioning said generally flat molded sheet of brake lining material into said forming press between said heated dies;

forming said generally flat molded sheet of brake lining material into said curved brake lining in said forming press by pressing said generally flat molded sheet of brake lining material between said heated dies of said forming press;

polymerizing said curved brake lining using heat from said heated dies of said forming press during said forming step;

removing said polymerized curved brake lining from said forming press.

2. The method according to claim 1 further comprising the step of letting said generally flat molded sheet of brake lining material cool prior to positioning said generally flat molded sheet of brake lining material in said forming press between said heated dies.

3. The method according to claim 1 wherein, said step of producing a generally flat molded sheet of brake lining material produces a partially polymerized sheet of brake lining material.

4. The method according to claim 3 wherein said step of polymerizing said curved brake lining using heat from said heated dies of said forming press during said forming step further polymerizes said curved brake lining.

5. The method according to claim 4 wherein said step of polymerizing said curved brake lining using heat from said heated dies of said forming press during said forming step fully polymerizes said curved brake lining.

6. The method according to claim 4 further comprising the step of post curing said further polymerized curved brake lining.

7. The method according to claim 4 further comprising the step of cutting said generally flat sheet of brake lining material into a plurality of pre-formed blanks and wherein said step of positioning said generally flat molded sheet of brake lining material into said forming press between said heated dies comprises positioning one preformed blank of said pre-formed blanks into said forming press between said heated dies and said step of forming said generally flat molded sheet of brake lining material into said curved brake lining in said forming press forms said one pre-formed blank into said curved brake lining by pressing said one pre-formed blank between said heated dies of said forming press.

8. The method according to claim 7 further comprising the step of letting said pre-formed blank cool prior to positioning said one pre-formed blank in said forming press between said heated dies.

9. A method of manufacturing a curved brake lining comprising the steps of:
  producing a generally flat partially polymerized sheet of brake lining material;
  cutting said generally flat sheet of brake lining material into a plurality of pre-formed blanks;
  positioning one preformed blank of said pre-formed blanks into a forming press between dies of said forming press;
  forming said one pre-formed blank into said curved brake lining in said forming press by pressing said one pre-formed blank between said dies of said forming press;
  heating said dies of said forming press during said forming step;
  further polymerizing said curved brake lining using heat from said heated dies of said forming press during said forming step;
  removing said further polymerized curved brake lining from said forming press.

10. The method of claim 9 further comprising the step of post curing said further polymerized curved brake lining.

11. The method of claim 9 wherein said step of further polymerizing said curved brake lining using heat from said heated dies of said forming press during said forming step fully polymerizes said curved brake lining.

12. The method of claim 9 further comprising the step of letting said one pre-formed blank of said pre-formed blanks cool prior to positioning said one pre-formed blank of said pre-formed blanks in said forming press between said dies of said forming press.

13. A method of manufacturing a lined brake shoe having a curved brake lining attached to a table, said method comprising the steps of:
  producing a generally flat molded sheet of brake lining material;
  heating dies of a forming press;
  positioning said generally flat molded sheet of brake lining material into said forming press between said heated dies;
  positioning said table into said forming press between said heated dies;
  placing a bonding material on one of said generally flat molded sheet of brake lining material and said table;
  forming said curved brake lining by conforming said generally flat molded sheet of brake lining material to said table and bonding said curved brake lining to said table in said forming press by pressing said generally flat molded sheet of brake lining material and said table between said heated dies of said forming press to form said lined brake shoe;
  polymerizing said curved brake lining using heat from said heated dies of said forming press during said forming step; and
  removing said lined brake shoe from said forming press after said bonding material secures said polymerized curved brake lining to said table.

14. The method according to claim 13 further comprising the step of letting said generally flat molded sheet of brake lining material cool prior to positioning said generally flat molded sheet of brake lining material in said forming press between said heated dies.

15. The method according to claim 13 wherein, said step of producing a generally flat molded sheet of brake lining material produces a partially polymerized sheet of brake lining material.

16. The method according to claim 15 wherein said step of polymerizing said curved brake lining using heat from said heated dies of said forming press during said forming step further polymerizes said curved brake lining.

17. The method according to claim 16 wherein said step of polymerizing said curved brake lining using heat from said heated dies of said forming press during said forming step fully polymerizes said curved brake lining.

18. The method according to claim 16 further comprising the step of post curing said further polymerized curved brake lining.

19. The method according to claim 13 further comprising the step of cutting said generally flat sheet of brake lining material into a plurality of pre-formed blanks and wherein said step of positioning said generally flat molded sheet of brake lining material into said forming press between said heated dies comprises positioning one pre-formed blank of said pre-formed blanks into said forming press between said heated dies and said step of forming said curved brake lining by conforming said generally flat molded sheet of brake lining material to said table and bonding said curved brake lining to said table conforms said one pre-formed blank of said pre-formed blanks to said table and bonds said one pre-formed blank to said table by pressing said one pre-formed blank between said heated dies of said forming Press to form said lined brake shoe.

20. The method according to claim 19 further comprising the step of letting said one pre-formed blank cool prior to positioning said pre-formed blank in said forming press between said heated dies.

21. The method according to claim 19 wherein, said step of producing a generally flat molded sheet of brake lining material produces a partially polymerized sheet of brake lining material.

22. The method according to claim 21 wherein said step of polymerizing said curved brake lining using heat from said heated dies of said forming press during said forming step further polymerizes said curved brake lining.

23. The method according to claim 22 wherein said step of polymerizing said curved brake lining using heat from said heated dies of said forming press during said forming step fully polymerizes said curved brake lining.

24. The method according to claim 22 further comprising the step of post curing said further polymerized curved brake lining.

* * * * *

UNITED STATES PATENT AND TRADEMARK OFFICE
CERTIFICATE OF CORRECTION

PATENT NO. : 6,245,180 B1  Page 1 of 1
DATED : June 12, 2001
INVENTOR(S) : Keith F. Barnhardt It is certified that error appears in the above-identified patent and that said Letters Patent is hereby corrected as shown below:

<u>Title page,</u>
Item [73], Assignee, "WI" should be -- MI --

<u>Column 2,</u>
Line 52, delete "and"
Line 54, delete "shoe." and substitute -- shoe; and -- therefor <u>Column 3,</u>
Line 10, "vehicles" should be -- vehicle's --
Line 21, delete "no" and substitute -- not -- therefor <u>Column 4,</u>
Line 5, "dosing" should be -- closing --

<u>Column 5, claim 9,</u>
Line 43, "preformed" should be -- pre-formed --

<u>Column 6, claim 19,</u>
Line 64, "Press" should be -- press --

Signed and Sealed this

Fifteenth Day of January, 2002

*Attest:*

JAMES E. ROGAN
*Attesting Officer*   Director of the United States Patent and Trademark Office